Feb. 22, 1966 V. A. WILHELM 3,237,023
PEAK AMPLITUDE SENSING CIRCUIT
Filed Dec. 29, 1961 2 Sheets-Sheet 1

INVENTOR.
VINCENT A. WILHELM
BY

INVENTOR.
VINCENT A. WILHELM
BY
ATTORNEY

United States Patent Office 3,237,023
Patented Feb. 22, 1966

3,237,023
PEAK AMPLITUDE SENSING CIRCUIT
Vincent A. Wilhelm, Mahwah, N.J., assignor to The Bendix Corporation, Teterboro, N.J., a corporation of Delaware
Filed Dec. 29, 1961, Ser. No. 163,257
9 Claims. (Cl. 307—88.5)

The invention relates to signal sensors and more particularly to peak amplitude sensing circuits.

Heretofore, a number of peak amplitude sensing circuits have been available. Some of these circuits were limited to a particular frequency or to a particular peak amplitude. One type of amplitude detector, shown in U.S. Patent No. 2,834,883, has time delay circuits with fast and slow time constants and a differential circuit using two critically selected electronic tubes. This type detector is complex in design and requires an independent re-set circuit. Also, the circuit is relatively unreliable because the electronic tubes must be critically selected and aged differently.

One object of the present invention is to provide a peak amplitude sensing circuit which is simple in design and reliable in operation.

Another object of the invention is to provide a novel peak amplitude detecting circuit which may be used to detect peak amplitude of a periodic alternating signal of various wave forms even though the signals vary in frequency and maximum amplitude.

Another object of the invention is to provide a novel peak amplitude detecting circuit which may be used to detect peak amplitude of a slow varying direct current signal.

Another object of the invention is to provide a novel peak amplitude detecting circuit that can detect peak amplitude of the envelope of an amplitude modulated signal.

The invention contemplates a circuit for sensing peak amplitude of a signal. The invention employs a first time delay circuit having a long time constant, and a second time delay circuit having a short time constant relative to the time constant of the first time delay circuit, and includes means for applying the signal to the time delay circuits. The circuit of the invention also employs a switch, which may, for example, be a transistor or a diode, between the time delay circuits and which is rendered conducting after the signal passes peak amplitude.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purpose only and are not to be construed as defining the limits of the invention.

Figure 1:
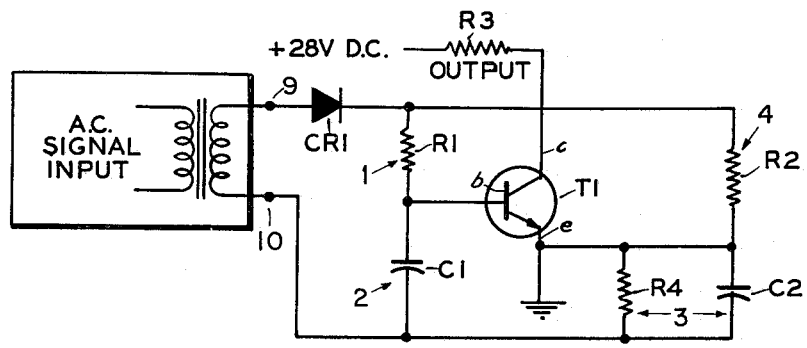
FIGURE 1 is a schematic drawing of a novel peak amplitude sensing circuit constructed according to the invention.

Referring to the drawing of FIGURE 1, shown therein is a peak voltage sensing circuit having a bridge confiuration. A first leg 1 of the bridge contains a resistor R–1 and an adjacent second leg 2 contains a capacitor C–1. The components R–1 and C–1 are selected so as to have a long time constant. A third leg 3 adjacent to second leg 2 contains a resistor R–4 in parallel with a capacitor C–2. Components R–4 and C–2 are chosen so as to have a short time constant relative to the time constant of component R–1 and C–1. A fourth leg 4 adjacent to third leg 3 contains a resistor R–2.

A transistor T–1 having a base $b$, an emitter $e$, and a collector $c$ is connected across the bridge with base $b$ connected at the junction of the first and second legs 1 and 2; and with emitter $e$ connected at the junction of third and fourth legs 3 and 4.

A series combination of a potential source, bearing legend +28 v. D.C., and a load resistor R–3 is connected between collector $c$ and emitter $e$.

The operation of the circuit is as follows: an input voltage, whose maximum amplitude is to be sensed, is applied across the bridge at input terminals 9 and 10. A rising portion of the signal charges capacitors C–1 and C–2. The values of the components R–1, R–2, and R–4, and C–1 and C–2 are selected to keep base $b$ of transistor T–1 slightly negative relative to emitter $e$, while the input signal is increasing. This keeps transistor T–1 nonconducting at cutoff.

When the input signal reaches a maximum and starts to decrease, capacitor C–2 begins to rapidly discharge through resistor R–4 due to the short time constant of R–4 and C–2. However, the voltage across capacitor C–1 is momentarily maintained because of the long time constant of capacitor C–1 with resistors R–1, R–2, and R–4. This causes transistor base $b$ to be held positive relative to emitter $e$, causing transistor T–1 to conduct. When transistor T–1 conducts, collector current flows in a loop from source +28 v. D.C. through load resistor R–3, transistor T–1 (from collector $c$, to emitter $e$), and back to a negative side (not shown) of the source. The flow of collector current is coincident with and marks a decrease in signal amplitude from a peak.

Simultaneously with the flow of collector current, there is also a flow of base current from base $b$ to emitter $e$, as capacitor C–1 discharges through transistor T–1 and resistor R–4. When capacitors C–1 and C–2 are discharged to the same value, base $b$ and emitter $e$ are at the same potential and transistor T–1 is rendered non-conducting. The discharge of capacitor C–1 through transistor T–1 automatically resets the circuit for detection of subsequent peak amplitude.

A diode CR–1 may be included in the circuit to prevent transistor T–1 from receiving an excessive reverse potential between base $b$ and emitter $e$ and to insure that the capacitors receive a charge of proper polarity.

The circuit of the invention detects the signal just after it passes through the peak amplitude regardless of signal amplitude. It is an important feature of the invention, that the circuit is not dependent on a particular signal amplitude.

The invention will also detect successive peaks of a periodic alternating signal even though the signal varies within a limited frequency range. For a frequency varying signal, it should be noted that the values of the resistor R–1 and capacitor C–1, which form one time delay circuit, and the value of resistor R–4 and capacitor C–2, which form another time delay circuit, are selected for peak amplitude detection of an alternating signal having a predetermined frequency. As the frequency of the signal increases beyond the predetermined frequency, the circuit detects, not the peak voltage, but a predetermined voltage amplitude below the peak. In certain applications, for example, phase comparison of two equal amplitude and equal frequency sinusoidal signals, it is not important to detect the peak amplitude, but merely to detect any two common amplitudes on both sinusoids, and for such applications, the sinusoids may vary over an extended frequency range.

The circuit of the invention will also detect the peak amplitude of a modulating signal or envelope, of an amplitude modulated signal. Resistors R–2 and R–4 and capacitor C–2 are selected to filter the carrier so that a voltage equal to the amplitude of the envelope is applied to capacitor C–2.

Figure 2:
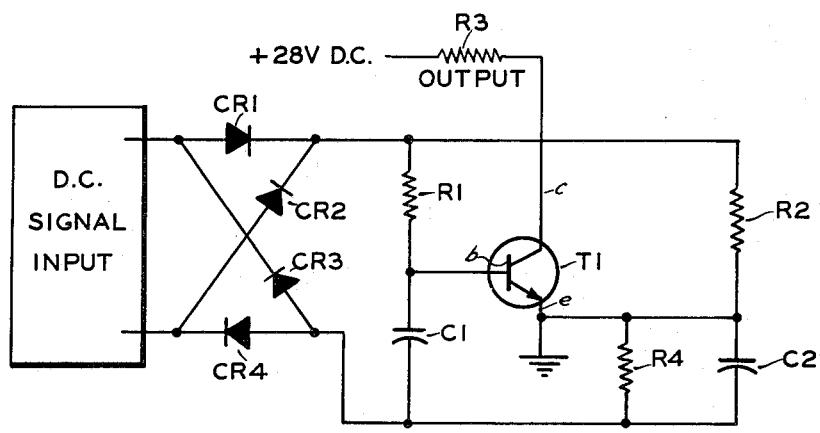
FIGURE 2 is a variation on the circuit of FIGURE 1.

The invention will also detect peak amplitude of a direct current signal, as shown in FIGURE 2. The circuit of FIGURE 2 is similar to the circuit of FIGURE 1, and like elements bear like legends. A full wave rectifying bridge comprising four diodes CR–1 through CR–4 arranged to full wave rectify an applied signal is connected between a D.C. signal input and the bridge cirucit. Both a positive and a negative peak amplitude are detected in the circuit of FIGURE 2, and the operation of the circuit is the same as described above in connection with FIGURE 1.

The invention is shown in the figures comprising a transistor T–1 of a NPN type. It is to be noted that the invention will perform equally well with a PNP transistor, the only changes in the circuit being a reversal of the polarity of the source and reversal of diode CR–1. If electrolytic capacitors are used in the circuit, they must also be reversed.

The circuit of the invention is not limited to transistors and will perform equally well with vacuum tubes or any element that operates as a switch. For example, a three terminal switch is characterized as having a control, a reference, and a potential, terminal (analogous to base, emitter, and collector in a transistor). Said switch having the property that a potential difference applied between control and reference terminals regulates a flow of electrical current from the potential to reference terminal.

Figure 3:
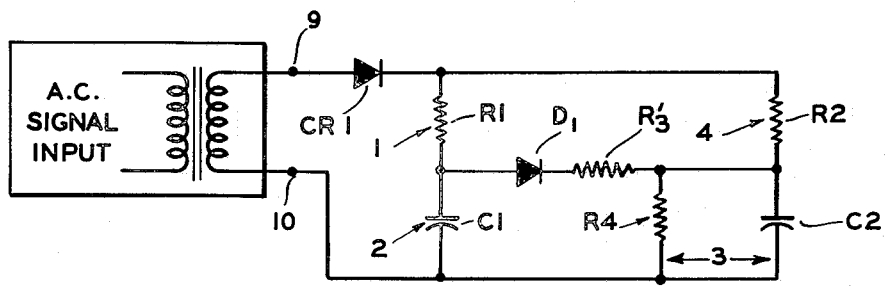
FIGURE 3 is a schematic drawing of a novel peak amplitude sensing circuit as shown in FIGURE 1 but using a diode instead of a transistor for switching.

Moreover, the invention is not limited to a three terminal element and will function satisfactorily, for example, with a diode connected between the two time delay circuits. For example, in the drawing of FIGURE 1, transistor T–1, source of potential +28 v. D.C. and load R–3 may be replaced as shown in FIGURE 3 by a diode $D_1$ serially connected with a load $R_1$. The diode is connected forward biased across the bridge from junction of legs 1 and 2 to junction of legs 3 and 4. The operation of the circuit with a diode is similar to operation with a transistor—the two time delay circuits hold the diode nonconducting during portions of signal that approach the peak (with anode negative relative to cathode) and render the diode conducting after the signal passes and recedes from the peak (anode positive relative to cathode).

The invention is shown having a resistive load R–3. In a practical circuit, the load would probably not be a resistor, but may be a relay or a detector.

There are many different values of the circuit parameters shown in FIGURE 2 for which the circuit will function satisfactorily. Since the circuit parameters may vary according to the design for any particular application, the following circuit parameters are included for the circuit of FIGURE 2 by way of example only.

Transistor T–1: 2N336
Diode CR–1: 1N646
Resistor R–1: 68K ohms
Resistor R–4: 68K ohms
Capacitor C–1: 25 microfarads.
Capacitor C–2: 2 microfarads
Resistor R–2: 4–514K ohms (suitable at test)
Battery B: 28 volts D.C.
Resistor R–3: 1K ohm
Signal source: 17.3 RMS sinusoid 400-cycle per second carrier, amplitude modulated by 0.5–6.0 cycle per second modulating signal.

In summary, the invention is a reliable peak amplitude sensing circuit having no critical elements and a simple design. The circuit may be used to detect peak amplitude either of a slowly varying direct current signal, or of the envelope of an amplitude modulated signal, or of a periodic alternating signal of various wave forms with varying frequency and with varying maximum amplitude.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:
1. A circuit for sensing peak amplitude of a signal comprising a first time delay circuit having a long time constant and a second time delay circuit having a short time constant relative to the time constant of the first time delay circuit, means for applying the signal to the time delay circuits, and switching means connected between the time delay circuits and rendered conducting upon discharge of the second time delay circuit immediately after the signal passes peak amplitude and means connected in the switching circuit and responsive to current flow in the circuit for providing an output immediately after the signal passes peak amplitude.

2. In the circuit of claim 1 each time delay circuit including a capacitor which charges as the signal approaches peak amplitude and discharges as the signal recedes from peak amplitude, one capacitor of one time delay circuit discharging through the switching means.

3. In the circuit for sensing peak amplitude of a signal of claim 1, the switching means including a transistor.

4. In the circuit for sensing peak amplitude of a signal of claim 1, the switching means comprising a diode.

5. A peak amplitude sensing circuit comprising:
    a bridge circuit having four legs,
        a first leg having a resistor,
        a second leg having a capacitor,
        the resistor and the capacitor in said legs in combination having a long time constant,
        a third leg having connected in parallel,
        a resistor and a capacitor having in combination a short time constant,
        a fourth leg having a resistor,
    a transistor having:
        a base,
        an emitter, and
        a collector,
        said base and emitter being connected between the junction of the first two legs and the junction of the last two legs,
    a source of electrical potential connected across the emitter and the collector,
    means connected across the bridge circuit at the junctions of the first two legs with the second two legs and adapted to receive a signal whose peak amplitude is to be sensed and load means connected in series with the electrical potential source and the transistor and responsive to current flow therein for providing an output immediately after the signal passes peak amplitude.

6. A peak amplitude sensing circuit comprising:
    a bridge circuit having four legs
        a first leg having a resistor,
        a second leg having a capacitor,
        the resistor and the capacitor in said legs in combination having a long time constant,
        a third leg having connected in parallel a resistor and a capacitor which in combination having a short time constant,
        a fourth leg having a resistor,
    a diode having two terminals
        one terminal being connected at the junction of the first two legs, and another terminal being connected at the junction of the last two legs, means at the junction of the first two legs with the second two legs adapted to receive a signal whose peak amplitude is to be sensed and load means connected in series with the diode and responsive to current flow therethrough for providing an output immediately after the signal passes peak amplitude.

7. A circuit for sensing peak amplitude of a signal having a first portion approaching and a second portion receding from the peak comprising
  (a) a transistor having a base, an emitter, and a collector,
  (b) a source of potential serially connected in a conducting loop including the collector and emitter,
  (c) load means serially connected with the potential source and the transistor and responsive to current flow therein for providing an output immediately after the signal passes peak amplitude,
  (d) a first time delay circuit having a long time constant including a resistor and a capacitor and having an output connected to the transistor and having an input adapted to receive the signal, and
  (e) a second time delay circuit having a short time constant relative to the time constant of the first time delay circuit and including a capacitor and a resistor and having an output connected to the transistor and having an input adapted to receive the signal.

8. In the circuit of claim 7, said first and second time delay circuits during the approaching portion of signal being adapted to provide at the output of one time delay circuit a slightly higher potential than at the output of the other time delay circuit so that the transistor is non-conducting during the approaching portion of the signal.

9. In the circuit of claim 7, the transistor comprising a NPN type transistor, and having the output of the long time constant circuit connected to the base of the NPN transistor and the output of the short time constant circuit connected to the emitter of the NPN transistor, and thus adapted to measure positive peaks of positive signal.

References Cited by the Examiner
UNITED STATES PATENTS

| | | | |
|---|---|---|---|
| 2,916,618 | 12/1959 | Adams et al. | 329—109 X |
| 3,004,174 | 10/1961 | Seidman | 307—88.5 |
| 3,060,329 | 10/1962 | Harrison et al. | 307—88.5 |
| 3,133,205 | 5/1964 | Zrubek | 307—88.5 |

OTHER REFERENCES

IBM Technical Disclosure Bulletin, "Peak Deletion Amplifier," by W. G. Crouse, vol. 4, No. 1, June 1961, page 33.

ARTHUR GAUSS, *Primary Examiner.*

JOHN W. HUCKERT, *Examiner.*